(12) United States Patent
Seror Goguet

(10) Patent No.: US 8,668,164 B2
(45) Date of Patent: Mar. 11, 2014

(54) AERO-ACOUSTIC OPTIMISATION METHOD FOR COMPLEX-SECTION MECHANICAL PARTS AND CORRESPONDING MECHANICAL PART AND LANDING GEAR

(75) Inventor: Christelle Seror Goguet, Tournefeuille (FR)

(73) Assignee: Airbus Operations (S.A.S.), Toulouse Cedex (FR)

( * ) Notice: Subject to any disclaimer, the term of this patent is extended or adjusted under 35 U.S.C. 154(b) by 312 days.

(21) Appl. No.: 13/163,895

(22) Filed: Jun. 20, 2011

(65) Prior Publication Data

US 2011/0309193 A1      Dec. 22, 2011

(30) Foreign Application Priority Data

Jun. 21, 2010  (FR) ...................................... 10 54911

(51) Int. Cl.
*B64C 25/16*            (2006.01)
(52) U.S. Cl.
USPC ........................ 244/102 A; 244/1 N; 244/130
(58) Field of Classification Search
USPC ...... 244/1 N, 130, 121, 100 R, 102 R, 103 R, 244/102 A
See application file for complete search history.

(56) References Cited

U.S. PATENT DOCUMENTS

| | | | | |
|---|---|---|---|---|
| 2,126,785 A | * | 8/1938 | Laddon | 244/130 |
| 2,435,956 A | * | 2/1948 | Craig | 174/95 |
| 5,538,285 A | * | 7/1996 | Goode | 280/819 |
| 5,601,254 A | * | 2/1997 | Ortiz et al. | 244/1 R |
| 5,649,679 A | * | 7/1997 | Perkins | 244/121 |
| 5,845,827 A | | 12/1998 | Reising | |
| 2009/0176078 A1 | * | 7/2009 | Seror et al. | 428/218 |
| 2010/0108805 A1 | * | 5/2010 | Piet et al. | 244/1 N |
| 2010/0320326 A1 | * | 12/2010 | Toews | 244/130 |

FOREIGN PATENT DOCUMENTS

| | | |
|---|---|---|
| EP | 1067045 | 1/2001 |
| EP | 1977969 | 10/2008 |
| FR | 2913948 | 9/2008 |
| WO | 0035750 | 6/2000 |

OTHER PUBLICATIONS

French Patent Office, International Search Report FR 1054911 (7 pgs.), Feb. 21, 2011.

* cited by examiner

*Primary Examiner* — Timothy D Collins
*Assistant Examiner* — Jamie S Stehle
(74) *Attorney, Agent, or Firm* — Wood, Herron & Evans, LLP

(57) ABSTRACT

An apparatus and method are provided for reducing the drag caused by a complex-section part in an airflow, for example the landing gear of an aircraft, making it possible to optimize the lift/drag ratio and to reduce the aerodynamic noise by reducing the local noise source. To do so, the complex-section part is masked with a special casing. More specifically, the aero-acoustically optimized complex-section metal mechanical part is fitted with an aerodynamically shaped cover made of several longitudinal parts articulated with hinges to facilitate their installation. This cover is attached to at least two supports placed away from one another along the axis of the part, each support locally mating with the section of the part.

15 Claims, 2 Drawing Sheets

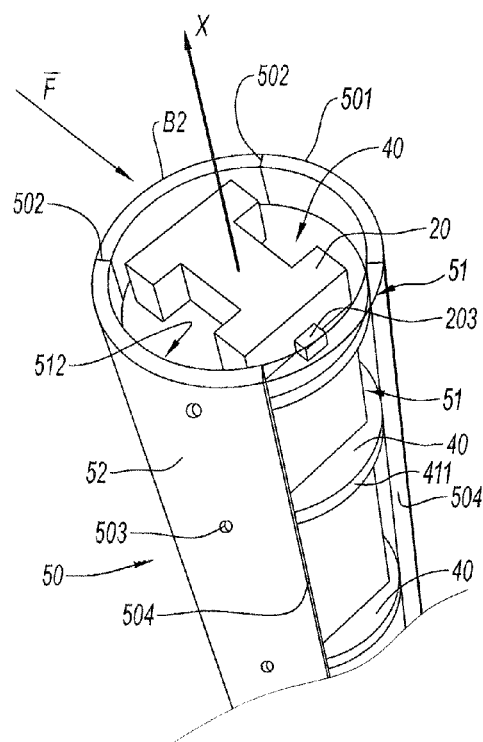
Fig. 4
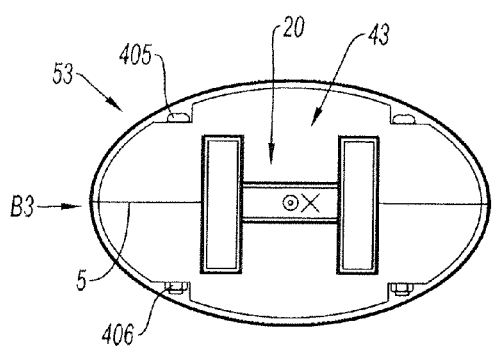 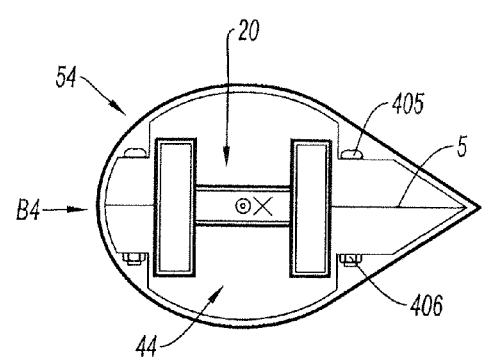
Fig. 5a          Fig. 5b

AERO-ACOUSTIC OPTIMISATION METHOD FOR COMPLEX-SECTION MECHANICAL PARTS AND CORRESPONDING MECHANICAL PART AND LANDING GEAR

CROSS-REFERENCE TO RELATED APPLICATION

This application claims priority to French Application No. 10 54911, filed on Jun. 21, 2010.

TECHNICAL FIELD

The invention relates to an aero-acoustic optimization method for complex-section mechanical parts, a mechanical part of this type, in particular "H" shaped, produced using this method and the landing gear of an aircraft comprising at least one such mechanical part as a strut.

BACKGROUND

Complex section or shape structures—i.e. structures with deep longitudinal grooves and, for example, an "H" or "X" section—have enhanced mechanical yield strength and rigidity properties. However, these structures cause the appearance of disturbances in an airflow. Effectively, if such a part is placed in an airflow, pressure fluctuations caused by the marked geometric variations in the surface of the part cause the appearance of vortexes forming a parasite drag. The interaction between such a turbulent flow and the solid surfaces of the part then generate an aerodynamic noise.

Aircraft wing flap systems and landing gear are therefore responsible, in the landing approach phase, for half of the noise perceived on the ground. Indeed, during this phase, the landing gear is lowered long before landing, for safety reasons, which causes the appearance of a highly turbulent flow and an aerodynamic noise.

Moreover, during approach and take-off phases, the aircraft requires an optimum lift/drag ratio to best negotiate the flying conditions, speed being particularly low in these phases. An optimum lift/drag ratio is obtained with minimal drag.

Furthermore, on take-off, an excess of drag requires an increase in thrust. Conversely, reducing drag makes it possible to optimise the thrust of the engine in this phase.

To reduce aerodynamic noise, the use of metal fairings, potentially articulated, to protect areas with complex-section parts to deflect airflows has been proposed, for example beneath the rocker arm of the landing gear, between the nose-gear actuating cylinders.

A sufficient number of these fairing parts must be securely fixed to comply with safety standards. These parts must also comply with constraints relating to retraction, hold space occupied when retracted, impact strength and aerodynamic loads, while limiting their mass load.

It is also possible to shape complex-shape parts by filling the grooves in order to create flat faces, without fairings. However, this solution may increase the mass of the landing gear. Moreover, if complex-section parts are replaced with bars, their mechanical properties can only be retained by increasing the size of the parts, and therefore the space they occupy.

Another solution involves applying a coating material with a lower density than that of the complex structural part in order to make its shape more aerodynamic without changing its mechanical properties. However, such an approach conflicts with maintenance conditions and complicates maintenance work. Indeed, such coatings require the removal of the structural part, prevent certain elements of the landing gear from being checked as the part is obscured, and need to be changed frequently on account of their usage conditions, resulting in additional grounding of the aircraft.

SUMMARY OF THE INVENTION

This invention is intended to reduce the drag and aerodynamic noise of a structural part, for example of the landing gear of an aircraft, making it possible to optimize the lift/drag ratio, by reducing the local noise source, which causes aerodynamic disturbances attributable to the complex section of the part, combined with an overall optimization of the aircraft related to the reduction in drag. Such a combination makes it possible to optimize the thrust of the engine in the case of an aircraft, without modifying the mechanical properties of the part or interfering with inspections of parts, in particular parts of a landing gear, or compromising the gear retraction function. To do so, the invention provides for the aerodynamic shaping of the complex part by masking its form with a special casing.

More specifically, the invention concerns an aero-acoustic optimisation method for a complex-section mechanical part having a longitudinal axis that can be placed in an airflow, involving aerodynamically enveloping the mechanical part, using means not attached to the part but that mate locally with it. Under these conditions, these separate means are positioned without removing the part.

Advantageously, the part is left partially visible to facilitate its inspection. Furthermore, passive noise absorption can be provided by partially enveloping it with a mesh. Preferably, the part is enveloped with a variable-curvature aerodynamic shape.

According to another aspect, the invention relates to a complex-section metal mechanical part aero-acoustically optimised according to the process above. The part is fitted with an aerodynamic envelope attached to means comprising at least two supports arranged away from one another along the axis of the part. Each support has an external contour and an internal contour at least partially applied to the section of the part. More specifically, the envelope comprises a cover having an external cylindrical face and an internal face that presses against the external contours of the supports to which the cover is attached using fixing means.

Advantageously, the supports enable the cover to be held without rotating or moving along the part, in particular by incorporating stops. Furthermore, the cover-support assembly leaves some clearance between the part and the supports, obviating any risk of moisture accumulation or damage to the part. The cover, which is separate from the part, is therefore not subject to the potential deformations of this part.

According to specific embodiments:
  each support comprises a plate of constant thickness and an internal contour that at least partially mates with the shape of the part;
  the external contours of the supports have a shape similar to that of the cover which has a constant thickness between its two faces;
  the external face of the cover has an aerodynamic shape of circular, elliptical, oblong, oval or droplet section that is at least partially cylindrical;
  the cover and/or the supports are made of composite or plastic material whose density is significantly lower than that of the metal part;

the cover has a longitudinal part made of material providing passive noise absorption, which may be a mesh with an appropriate opening size, a bristle surface of suitable density or a sharkskin coating.

The invention also concerns the landing gear of an aircraft comprising at least one mechanical part of the type defined above. This mechanical part has an "H" shaped complex section and serves as a main or secondary strut in the landing gear.

Advantageously, the supports and the cover of each strut are modelled sufficiently closely to the "H" shaped section such as to ensure that retraction of the gear into the hold is not impeded and that there is no interaction with other parts. Furthermore, the installation and removal of the supports and the cover, for example for an inspection or a retrofit, are easily undertaken with simple tools and require no specific fixing point on the landing gear, such that their presence does not disturb inspections of the landing gear.

BRIEF DESCRIPTION OF THE DRAWINGS

Other data, characteristics and advantages of this invention are set out in the description below, with reference to the figures attached which show, respectively:

FIG. 4 is a partial perspective schematic view of a strut fitted with an aerodynamic cover having a longitudinal part made of a mesh, and FIGS. 5a and 5b are, two cross section views of alternatively shaped aerodynamic covers.

DETAILED DESCRIPTION

Figure 1:
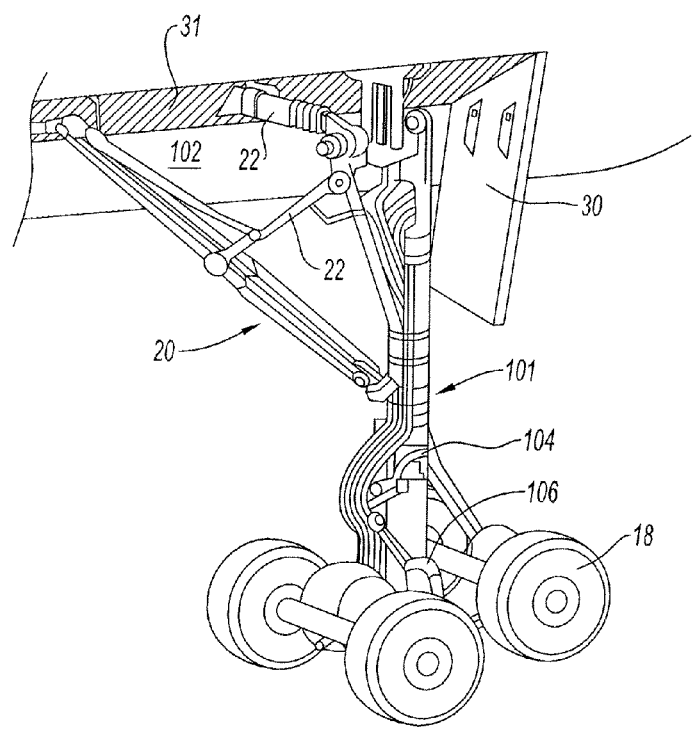
FIG. 1 is a schematic view of a landing gear with struts according to the state of the art.

With reference to FIG. 1, a landing gear on the ground comprises schematically a main shaft 101, connected to an aircraft structure 102, to which are connected a shock absorber 104 and a positioning cylinder 106 and, at the end, pairs of wheels 18. A main strut 20 and a secondary strut 22 brace the articulation of the main shaft 101 in the aircraft structure 102 through the hatch 30 in the hold 31 which is open when idle, as shown in the figure.

The parts and in particular the struts 20, 22 are made of metal alloy. The struts 20, 22, as shown schematically by strut 20 in FIG. 2, have an "H" section longitudinal part structure, with wide deep longitudinal grooves 201. This shape provides parts with particularly high mechanical torsional strength and rigidity properties.

Figure 2:
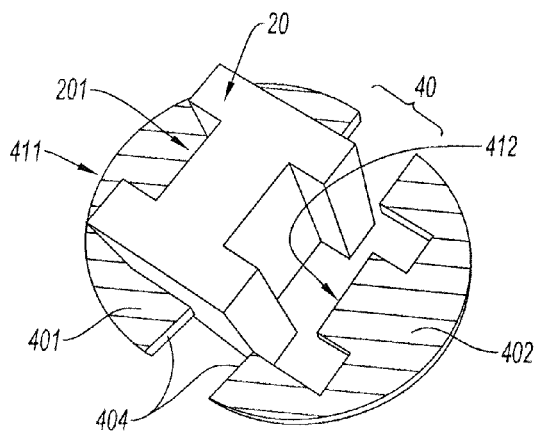
FIG. 2 is a schematic perspective view of a circular-section aerodynamic envelope support during installation on a landing gear strut.

In order to significantly reduce the parasite drag and the noise caused by the presence of these struts 20 when the landing gear 10 is deployed from the hold, such parts are provided with an envelope fixed to the supports 40, such as the one illustrated schematically in FIG. 2. In this example, the support 40 is shown before assembly and comprises two identical half-plates 401 and 402 of composite material and constant thickness forming two half-supports. Alternatively, the half-plates 401, 402 may be made of plastic or another material having a lower density than that of the mechanical parts 20, 22.

Each half-plate 401, 402 has a semi-circular external contour 411 and an internal contour 412 whose wall is cut according to the shape of the strut 20 to mate with the contour after assembly. Alternatively, the number of base plates may be greater than two and the internal wall may mate with the shape of the strut only partially.

Figure 3:
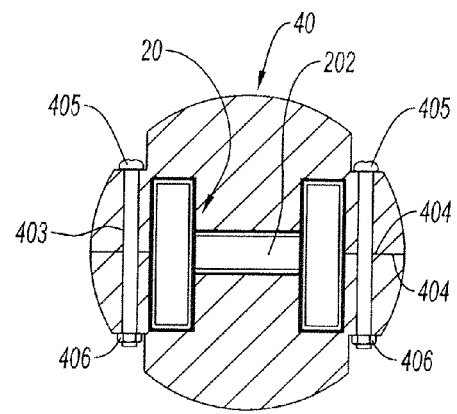
FIG. 3 is a schematic view of the support following its installation on the strut according to FIG. 2.

The half-plates 401, 402 are drilled so that they can be fixed together, as shown schematically in FIG. 3. The drill holes 403, shown transparently, are made in the mass perpendicular to the flat faces 404 (FIG. 2) of the half-plates 401, 402 which are placed beside one another in the prolongation of the central bar 202 of the "H" of the strut 20 shown in cross-section. The half-supports are then assembled using bolt-nut systems 405, 406 to form the circular support 40. Alternatively, each support 40 may comprise at least two plate parts connected to each other by any known means: clamping collars, hooks, studs, etc.

The support 40 has a contour similar to the part 20 in order to reduce the space it occupies and that of the envelope which will be attached to the supports 40 of this type.

The support 40 remains in position on the strut 20, while leaving sufficient clearance to prevent the risks of moisture accumulation and damage to the part 20. The support 40 therefore remains separate from the strut 20. To prevent all subsequent movement, the strut 20 may advantageously be fitted with stops 203 as explained below.

With reference to the perspective view in FIG. 4, three supports 40 are attached to the part 20 in order to attach an envelope in the form of an aerodynamic cover 50. The number of supports 40 may naturally be greater than two, for example as a function of the length of the part 20, the materials used or the thickness of the supports 40. The cover 50 is made of a material whose density is significantly lower than that of the metal part 20, for example composite or plastic material. In order to stop the cover/envelope 50 from moving along the longitudinal axis X, stops 203 are formed on the part 20, on either side of at least one support 40.

In the example shown, the cover 50 has an exterior cylindrical face 501 of constant thickness and circular section, and an axis shared with the central symmetrical axis X of the strut 20. The cover 50 includes a longitudinal part 51 (shown as transparent in FIG. 4) formed by a mesh with an opening size particularly suitable for absorbing noise in order to optimize noise reduction.

The cover 50 advantageously has at least one hinge 502, two in the figure, in order to facilitate its installation on the supports 40. The internal face 512 of the cover 50 bears against the external contour 401 of the supports 40. The cover 50 is attached to these supports 40 using bolts 503 or other fixing elements (hooks, studs, etc.). The meshed part 51 is attached to the longitudinal edges 504 of the full part 52 of the cover 50 by any known coupling elements. Fixings may also be provided on the supports 40. The cover 50 is arranged in relation to the landing gear such that the airflow {right arrow over (F)} hits the full part 52 of the cover 50, along its leading edge B2. Alternatively or cumulatively, a translucent or transparent portion, also made of plastic or composite material, may also be inserted in the same manner as the meshed part 51.

According to other variants, shown by the cross sections in FIGS. 5a and 5b, the supports and the cover attached to the strut 20 may have optimized aerodynamic shapes: an elliptical shape (support 43 and cover 53 in FIG. 5a) or a droplet shape (support 44 and cover 54 in FIG. 5b). The leading edges B3 and B4 are then formed by the lines of the cover, respectively, that are parallel to the central axis X of the part 20 and located at the level of the maximum curvature of the cover respectively 53 and 54. The supports 43, 44 are created in the figures using two half-plates butted along the mating surfaces 5 by bolt-nut systems 405, 406. In general, the cover 53, 54 may have an external face with an aerodynamic shape of circular, elliptical, oblong, oval, droplet or another section, at least part of which is cylindrical.

The invention is not limited to the exemplary embodiments described and shown. Thus, regardless of the different shapes, the form of the cover and its extension only partially covers the part lengthways. In particular, apertures made locally make it possible to enable the passage of the connections, such as springs, connecting rods and cables, of the part to other elements of the gear, such as not to interfere with these elements, while protecting the connections from impacts and shocks.

The invention claimed is:

1. An aero-acoustic optimization method for a mechanical metal part structure extending longitudinally along a longitudinal axis and that can be placed in an airflow, the metal part structure having a longitudinal groove extending parallel to the longitudinal axis and a transverse cross-section perpendicular to the longitudinal axis, the method comprising:
   arranging at least two supports such that each support is positioned about the longitudinal axis of the metal part structure, each support having an external contour and an internal contour, the internal contours mated at least partially against the transverse cross-section of the metal part structure, and such that the at least two supports are arranged offset from each other in a direction of the longitudinal axis; and
   aerodynamically enveloping the metal part structure with an aerodynamic envelope attached to the at least two supports and including a cover having an external cylindrical face and an internal face that presses against the external contours of the at least two supports, and the cover is attached to the at least two supports using fixed connectors, such that the cover transversely envelops the at least two supports and at least a portion of the longitudinal groove from the airflow.

2. The method according to claim 1, further comprising:
   leaving the part partially visible to facilitate inspection of the part.

3. The method according to claim 1, further comprising:
   providing passive noise absorption by partially enveloping the part with a mesh.

4. The method according to claim 1, further comprising:
   enveloping the part by a variable-curvature aerodynamic shape.

5. A mechanical part that is aero-acoustically optimized for placement in an airflow, the mechanical part comprising:
   a metal part structure extending longitudinally along a longitudinal axis, the metal part structure having a longitudinal groove extending parallel to the longitudinal axis and a transverse cross-section perpendicular to the longitudinal axis,
   at least two supports, each support positioned about the longitudinal axis and having an external contour and an internal contour, the internal contour at least partially mated against the transverse cross-section of the part structure, wherein the at least two supports are arranged offset from each other in a direction of the longitudinal axis, and
   an aerodynamic envelope attached to the at least two supports and including a cover having an external cylindrical face and an internal face that presses against the external contours of the at least two supports, and the cover is attached to the at least two supports using fixing connectors such that the cover transversely envelops the at least two supports and at least a portion of the longitudinal groove from the airflow.

6. The mechanical part according to claim 5, further comprising:
   stops that are formed on the part structure and placed on either side of the at least two supports to stop the cover from moving.

7. The mechanical part according to claim 5, wherein each of the at least two supports comprises a plate of constant thickness.

8. The mechanical part according to claim 5, wherein each of the at least two supports comprises at least two parts connected to each other.

9. The mechanical part according to claim 5, wherein the external cylindrical face of the cover has an aerodynamic shape of circular, elliptical, oblong, oval or droplet section that is at least partially cylindrical.

10. The mechanical part according to claim 5, wherein at least one of the cover and the at least two supports are made of composite or plastic material defining a density significantly lower than a density of the metal part structure.

11. The mechanical part according to claim 5, wherein the cover comprises at least two cover parts and a longitudinal hinge between the at least two parts that can open along a longitudinal length of the part structure.

12. The mechanical part according to claim 5, wherein the cover partially covers the part structure and includes locally made apertures.

13. The mechanical part according to claim 11, wherein at least one of the at least two cover parts includes a longitudinal part made of plastic or composite translucent material.

14. The mechanical part according to claim 11, wherein at least one of the at least two cover parts includes a longitudinal part made of material providing passive noise absorption, selected from at least one of:
   a mesh with an appropriate opening size,
   a bristle surface of suitable density, or
   a sharkskin coating.

15. Landing gear of an aircraft comprising:
   at least one "H" shaped mechanical part according to claim 5, the mechanical part being used as a strut in the landing gear.

* * * * *